United States Patent [19]
Malloy et al.

[11] Patent Number: 6,164,892
[45] Date of Patent: Dec. 26, 2000

[54] FREIGHT LOADING SYSTEM

[75] Inventors: John F. Malloy, Northridge; Roy R. Roberts, Westchester; Gane Senaratne, Rancho Palos Verdes, all of Calif.

[73] Assignee: Mega Loading Systems, Inc., El Segundo, Calif.

[21] Appl. No.: 09/366,415

[22] Filed: Aug. 4, 1999

[51] Int. Cl.[7] .............................. B64F 1/32; B65G 65/02
[52] U.S. Cl. .................. 414/398; 244/137.1; 198/370.1; 414/344
[58] Field of Search ........................ 244/137.1; 414/398, 414/344; 198/370.1

[56] References Cited

U.S. PATENT DOCUMENTS

| 3,263,832 | 8/1966 | Williams, Jr. et al. | 414/344 |
| 3,561,623 | 2/1971 | McCaul | 198/350 |
| 3,568,862 | 3/1971 | Walkloff | 244/137.1 X |
| 3,589,490 | 6/1971 | Walkhoff | 414/347 |
| 3,595,407 | 7/1971 | Muller-Kahn et al. | 414/344 |
| 3,727,581 | 4/1973 | Brent | 244/137.1 X |
| 4,218,034 | 8/1980 | Magill | 244/137.1 |
| 4,852,712 | 8/1989 | Best | 414/373 X |

FOREIGN PATENT DOCUMENTS 3195626  8/1991  Japan ................................. 198/370.1

Primary Examiner—Steven A. Bratlie
Attorney, Agent, or Firm—Irving Keschner

[57] ABSTRACT

An airport loading system which utilizes various conveyor and elevated configurations to load aircraft rapidly while requiring significantly less processing area. The aircraft loading/unloading turn around time is significantly reduced because the pallets in which the freight is loaded are not lowered to the freight ramp but instead transferred to the system platform.

7 Claims, 4 Drawing Sheets

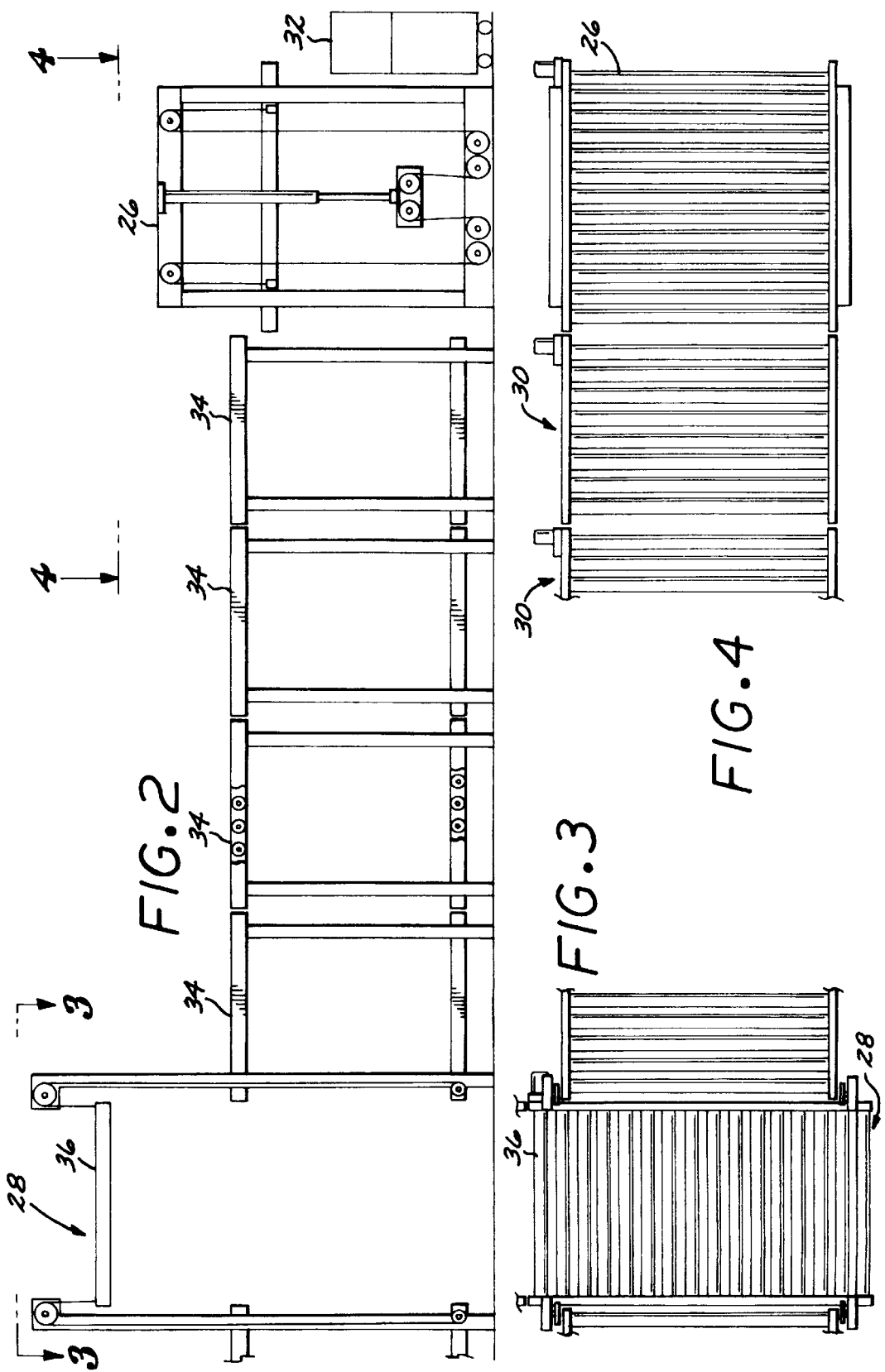

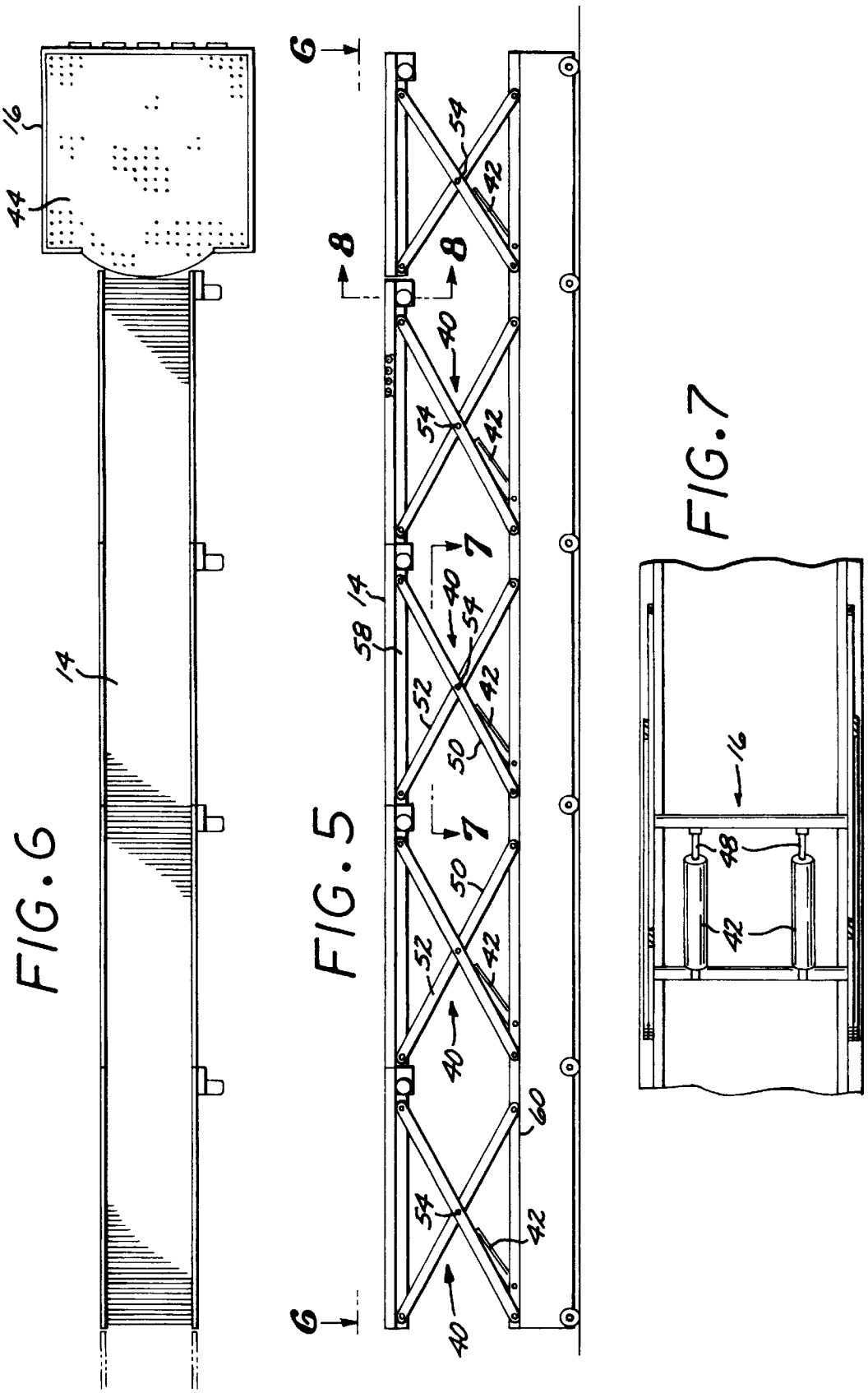

FREIGHT LOADING SYSTEM

BACKGROUND OF THE INVENTION

1. Field of the Invention

A cargo loading system that saves time staging and loading air freight.

2. Description of the Prior Art

In ordinary circumstances, most if not all of the freight arriving on a particular aircraft will be prepacked on pallets, the size and shape of which may vary depending upon the particular aircraft and the designated fuselage location thereof. Traditional unit load devices require high vertical clearances in the cargo building to provide random access to each pallet via an elevated transfer vehicle (ETV). A storage system utilizing an ETV takes considerable time to place the pallet in storage and an equal amount of time to retrieve and place the pallet on a transporter or dolly. If using dollies, the cargo is then staged on the ramp to await the arrival of the aircraft.

Loading of freight is typically accomplished, after the aircraft arrives, by positioning a K loader adjacent the aircraft door to commence the process. The conventional method of unloading aircraft moves two pallets to a K loader (mobile equipment powered by a diesel engine) and having a two pallet position at the aircraft door. Another two pallet position is outboard of the position of the aircraft door and elevates from the dolly level to the aircraft deck by means of a scissors lift to be lowered to the dolly level in approximately five minutes. If all thirty pallets are unloaded, the procedure takes approximately one hour and fifteen minutes. Loading the aircraft (reverse procedure) takes approximately the same amount of time, a total of two and one half hours.

As economic globalization increases the amount of freight carried by aircraft, the number of cargo aircraft parking positions required also increases to allow for additional freight, or, cargo storage space. Costs associated with acquiring space adjacent airports, typically near cities in developed countries, to accommodate the need for more cargo storage space is typically very high.

What is thus desired is to provide a freight loading/unloading system which saves time staging and loading and unloading air freight and also reduces the airport land area required to accommodate the expected large increases in air freight.

SUMMARY OF THE PRESENT INVENTION

The present invention provides a freight loading/unloading system which reduces the time necessary for staging and loading air freight and also reduces the amount of land necessary to process increased air freight at airports.

The system of the present invention utilizes an area of approximately 105 feet by 85 feet with a height cleared to approximately 30 feet creating 120 pallet positions, allowing 90 pallet positions for storage and 30 pallet positions for speed unloading. Extending the system an additional 16 feet provides an additional 20 pallet storage positions.

Once a pallet is built, it is positioned in the system to be loaded on an aircraft. The system of the present invention transfers pallets from the aircraft to the upper storage deck, transferring six pallets from the aircraft level to the elevated deck in approximately two minutes. The system has the capability of delivering six pallets every minute to the aircraft door for loading compared to the fifteen minutes required by the conventional K loader. The system of the present invention thus reduces the aircraft turn around time because the pallets are not lowered to the ramp but instead transferred to the system platform.

DESCRIPTION OF THE DRAWING

For a better understanding of the invention as well as other objects and further features thereof, reference is made to the following description which is to be read in conjunction with the accompanying drawings herein:

FIG. 2 shows the loading system of the present invention with two directional conveyors;

FIG. 3 is a view along line 3—3 of FIG. 2;

FIG. 4 is a view along line 4—4 of FIG. 2;

FIG. 5 is a side view of the loading bridge of the freight loading system of the present invention;

FIG. 6 is a view along line 6—6 of FIG. 5;

FIG. 7 is a view of the hydraulic system that changes the height of the loading bridge.

DESCRIPTION OF THE INVENTION

Figure 1:
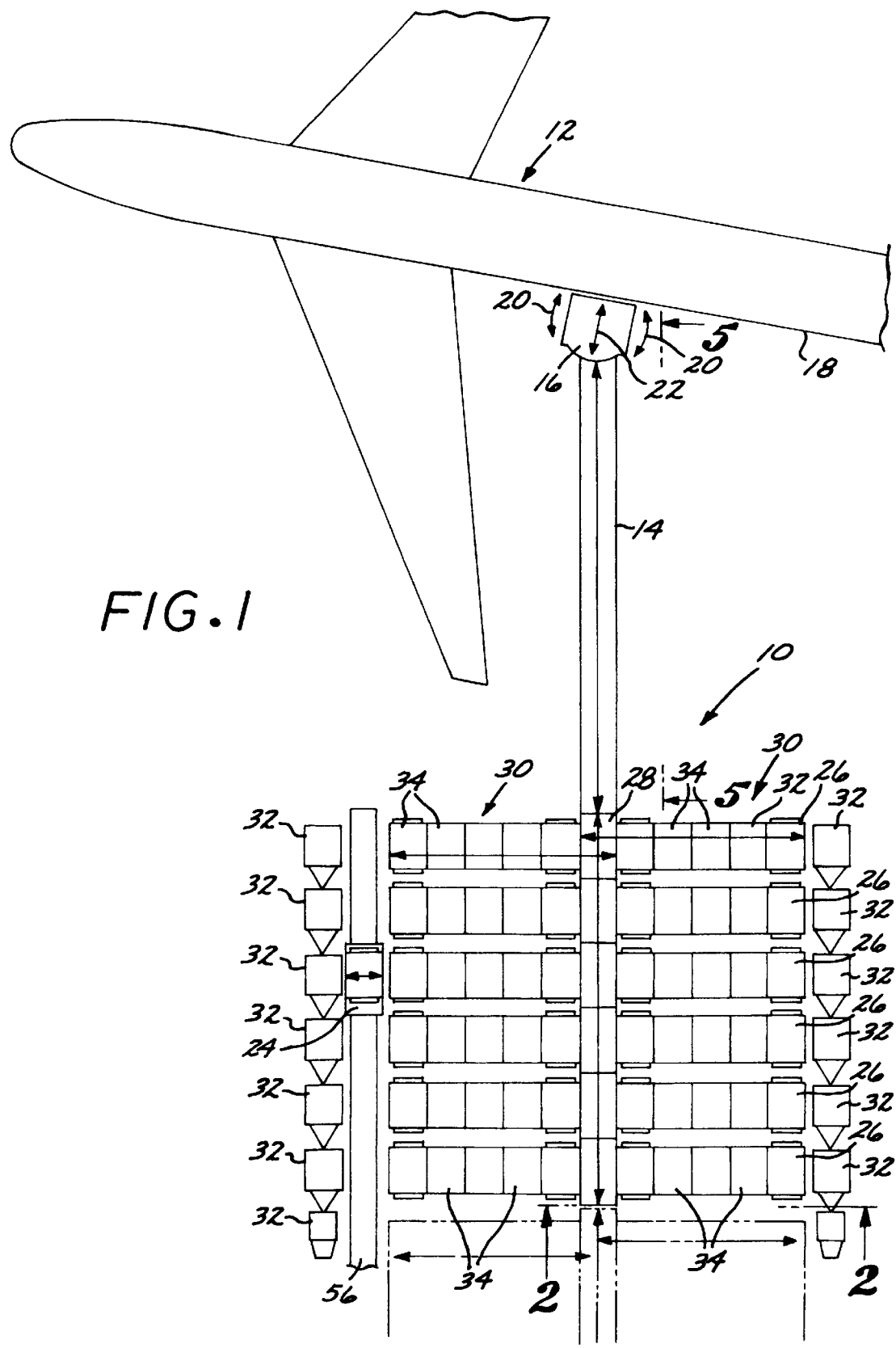
FIG. 1 shows an aircraft parked adjacent to the loading system of the present invention.

Referring now to FIG. 1, the freight loading system 10 of the present invention is shown adjacent to a parked aircraft 12, such as a Boeing Corporation 747 model jet airliner. Conveyor 14 of system 10 is shown in the extended position with adjustable plate 16 moved adjacent to the freight loading door located in the aircraft fuselage 18. Plate 16 has the capability of being moved in the direction of arrows 20 (rotational) and 22 (linear) to accurately position plate 16 adjacent the aircraft freight door.

FIG. 1 shows two optional loading/unloading configurations, the left had portion of the figure illustrating the use of an elevated transfer vehicle, or ETV 24, the right hand portion of the figure illustrating the use of a fixed elevator devices 26 to move cargo in a vertical direction.

Conveyor 14 is positioned, at its other end, adjacent a vertically movable conveyor system 28. Positioned adjacent conveyor system 28 is a plurality of powered conveyors (six shown in the Figure) 30 having upper and lower operating levels which are configured to move substantially perpendicular to the direction of movement of conveyor system 28. A row of dollies 32 are positioned adjacent ETV 24 in one embodiment and adjacent a plurality of fixed elevator devices 26 in the other embodiment.

FIG. 2 illustrates in more detail the components comprising the configuration of the cargo loading/unloading system of the present invention. In particular, interposed between fixed elevator devices 26 and conveyor system 28 are a plurality (six shown) of rows of powered conveyor stations 30, each conveyor or station comprising a plurality of conveyor belt modules 34. Conveyor stations 30 are fixed in height.

FIG. 3 shows conveyor system, or center lift, 28 that moves cargo to/from the upper level of conveyor 30 to the level of the conveyor 14. Conveyor 28 comprises a computer controlled platform 36 which is capable of moving to the upper level of conveyor 30 to receive or discharge cargo carried thereby. Platform 36 is a right angle transfer deck and has an adjustable set of rollers capable of moving cargo in one or two orthogonal directions dependent upon whether the cargo is moving to the aircraft from conveyors 30 or to the dollies from conveyors 30.

FIG. 4 illustrates the two of the powered directional conveyors 30 and the fixed elevator 26, preferably a chain driven hydraulic elevator lift.

FIG. 5 is a side view of conveyor 14. Conveyor 14 is adjustable in height to match the elevation of the aircraft main deck and comprises a plurality of scissor-like lifts 40 positionable by air cylinders 42.

FIG. 6 is a top view of conveyor 14 illustrating plate, or end, platform 16 that is rotatable to align with the aircraft freight loading/unloading door. A ball mat 44 is shown formed on plate 16.

FIG. 7 illustrates in more detail the hydraulic system 46 that adjusts the height of conveyor 14. In particular, hydraulic system 46 comprises a pair of air cylinders 42, pistons 48 of each cylinder 42 being coupled to scissor rods 50 and 52. When cylinder 42 is energized by a conventional computer controlled power source (not shown), the scissor rods 50 and 52 are movable upwardly (or downwardly) about pivot point 54. Since the ends of the scissor rods 50 and 52 are connected to upper and lower tracks 56 and 58, conveyor 14, in turn, is movable in the upward (or downward) direction.

Figure 8:
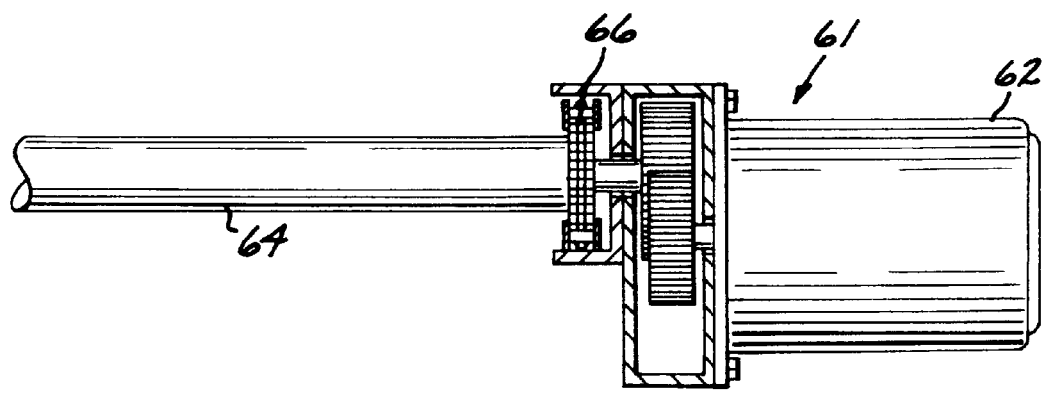
FIG. 8 shows a preferred version of a power ball mat to enable freight to be moved in four quadrants.

FIG. 8 illustrates one version of a power ball mat 44. The ball mat 44 has balls that rest on powered rollers that controls the direction of ball rotation. The rollers are set at a 90 degree angle so that freight can be moved forward, backward and to the left or right. In accordance with the teachings of the invention, a right angle transfer deck, manufactured by FMC Corporation, Chicago, Ill., is utilized on the controlled platform 36 and the pallet rotation transfer plate 16, also manufactured by FMC Corporation, is used on the outer end of conveyor 14 with slot extensions to meet the aircraft 12.

The loading of aircraft 12 is accomplished as follows:

First the aircraft is parked; conveyor 14 is then elevated so that it is at the level of the aircraft cargo door. The conveyor 14 is then extended to the aircraft door. The ball mat 44, shown in FIG. 8, is then rotated to have its outer edge parallel to the cargo door. Slots in the ball mat are extended to meet the edge of the cargo doorway. Aircraft deck clamps are removed from the cargo pallets as the outer conveyor 14 is extended. When the slots are extended, pallets are then moved onto the outer conveyor 14.

The dollies, previously loaded with cargo at the warehouse, are moved adjacent to the ETV 24 (left hand FIG. 1 configuration) or to the fixed elevator lift (right hand FIG. 1 configuration). In the first configuration, cargo from the dollies are transferred, one at a time, to ETV 24, ETV 24 going back and forth along track 56 to receive the cargo from each dolly in sequence at the lower level of conveyor system 30. ETV 24 is then elevated to the upper level of conveyor system 30 and the cargo transferred to the conveyor module adjacent thereto. For efficiency purposes, all the conveyor modules (five shown) in a particular row are filled with cargo before the next row is loaded (six rows illustrated although more or less can be utilized). Conveyor 28 is then lowered to the level of conveyors 30, the conveyor rollers activated and the cargo then moved via conveyor 14 and plate 16 into the aircraft. Once the initial cargo load has passed the first power conveyor 30 closest to the aircraft, the next sequence of loading can occur, starting at the first loading position the furthest away from the aircraft 12. The process is repeated until all the cargo is loaded onto aircraft 12.

In the second configuration the dollies deliver the cargo to fixed elevator lifts 26 and the lifts then transfer the cargo to the upper surface of conveyor systems 30 and the same loading process is followed thereafter.

Cargo can be stored at the lower level of conveyor system 30 for loading onto another arriving aircraft.

Unloading of aircraft 12 is basically the reverse of the loading process described hereinabove. Pallets are transferred across plate 16 from aircraft 12 to conveyor 14, conveyor 14 moves the cargo to conveyor 28, conveyor 28 with cargo thereon is then aligned (lowered) with the upper level of conveyors 30 in sequence, then onto lifts 26 and then lowered and transferred to the dollies until all the cargo is removed from aircraft 12.

A conventional microprocessor based system is utilized to provide the necessary control and timing signals.

The present invention thus provides an airport loading system which utilizes various conveyor and elevator configurations to load/unload aircraft rapidly, reducing the number of required aircraft parking positions, and thus significantly reducing the processing area. The aircraft unloading/loading turn around time is significantly reduced because the elevation difference between the aircraft main deck and the upper storage deck of conveyor 14 is generally never more than four feet whereas conventional scissors lift (K loaders) change elevation 13 feet for every two pallets loaded or unloaded thus reducing the time and costs of the loading/unloading process. The loading system of the present invention changes elevation three feet for six pallets, while the balance of the elevation change is accomplished by side elevators operating at the same time.

When incorporated into a cargo facility the lower storage deck will provide storage of an additional 48 pallet positions. The size of the system can be expanded or reduced to meet the needs of the cargo building or airport.

While the invention has been described with a reference to its preferred embodiment, it will be understood by those skilled in the art that various changes may be made and equivalents may be substituted for elements thereof without departing from the true spirit and scope of the invention. In addition, modifications may be made to adapt a particular situation or material to the teachings of the invention without departing from its essential teachings.

What is claimed is:

1. A system for rapidly loading cargo on an aircraft comprising:

a first conveyor system, extendible friom a first position to a second position in a first direction;

a second conveyor system operatively coupled to said first conveyor system and being movable in a vertical direction; said second conveyor system also being movable in said first direction;

a third conveyor system movable in a second direction substantially orthogonal to said first direction, said third conveyor system comprising a plurality of powered conveyors, each of said plurality of powered conveyors being operatively coupled to said conveyor system and having first and second loading levels; and means for positioning said cargo on said second loading level of each of said plurality of powered conveyors, said third conveyor system transporting said cargo to said second conveyor system, said second conveyor system receiving said cargo at a level corresponding to said first loading level of each of said plurality of powered conveyors.

2. The system of claim 1 wherein said second conveyor system is moved to said first loading level to receive the cargo on said third conveyor system.

3. The system of claim 1 wherein each of said plurality of powered conveyors are substantially orthogonal to said first direction.

4. The system of claim 1 wherein each of said plurality of powered conveyors comprises a plurality of belt modules.

5. The system of claim 1 wherein two sets of said plurality of powered conveyors are provided, one on each side of said second conveyor system.

6. The system of claim 1 wherein each of said powered conveyors are loaded with a first set of cargo, the cargo being transfered to said second conveyor system.

7. The system of claim 6 wherein said plurality of powered conveyors are reloaded with a second set of cargo subsequent to the transfer of said first set of cargo to said second conveyor system.

\* \* \* \* \*